P. W. LARSON.
CONCAVE.
APPLICATION FILED APR. 8, 1911.

1,034,469.

Patented Aug. 6, 1912.

Witnesses

Inventor
Paul W. Larson
By Victor J. Evans
Attorney

UNITED STATES PATENT OFFICE.

PAUL W. LARSON, OF SWEA CITY, IOWA.

CONCAVE.

1,034,469.    Specification of Letters Patent.    Patented Aug. 6, 1912.

Application filed April 8, 1911. Serial No. 619,743.

*To all whom it may concern:*

Be it known that I, PAUL W. LARSON, a citizen of the United States, residing at Swea City, in the county of Kossuth and State of Iowa, have invented new and useful Improvements in Concaves, of which the following is a specification.

This invention relates to threshing machines and more particularly to concaves therefor.

The object of the invention is to provide an auxiliary concave having movable teeth which may be thrown into or out of operative position with relation to the cylinder teeth when desired.

The invention embodies an auxiliary grate having separate shafts mounted therein with teeth thereon arranged in staggered relation, and a worm screw connected to each of the shafts through suitable levers for turning the shafts whereby the teeth may be carried into or out of operative position.

Further objects of the invention will appear as the following specific description is read in connection with the accompanying drawings, which form a part of this application, and in which:—

Figure 1:
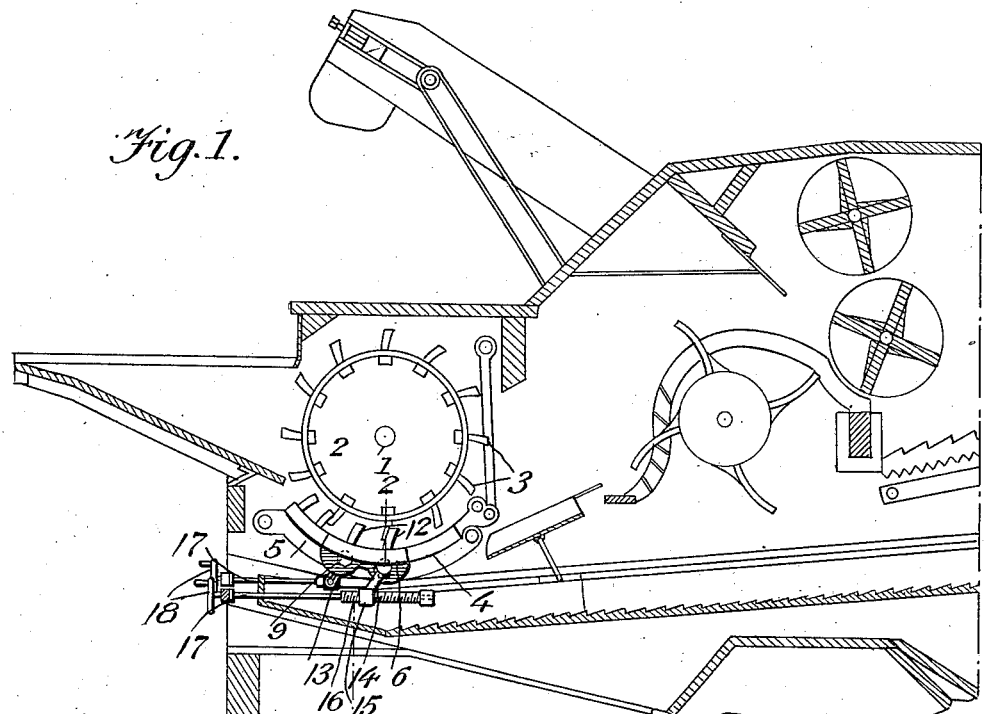
Figure 2:
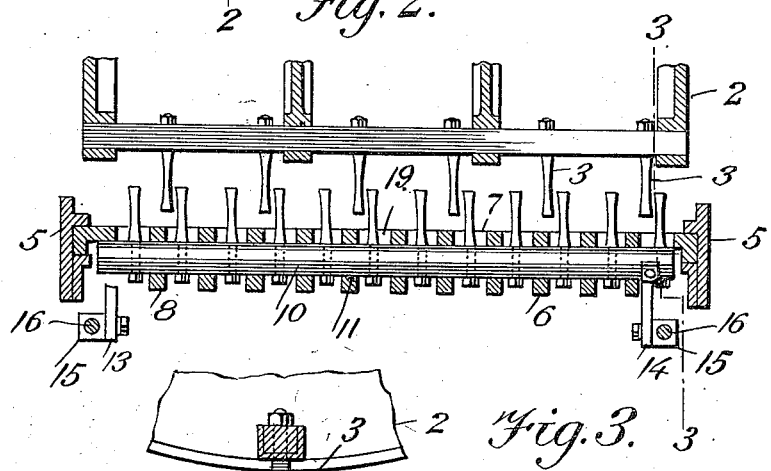
Figure 3:
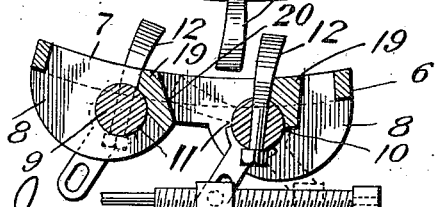

Figure 1 is a section taken through a threshing machine showing the cylinder and concave in elevation therein. Fig. 2 is a section on the line 2—2 of Fig. 1. Fig. 3 is an enlarged detail sectional view on the line 3—3 of Fig. 2.

Referring more particularly to the drawing, 1 represents the cylinder shaft upon which the cylinder 2 is mounted. This cylinder is provided with the usual cylinder teeth 3 which travel over the concave 4 and in between the teeth carried thereby.

Mounted in the hangers 5 secured to the frame of the machine, not shown, is a grate or auxiliary concave 6 which is provided with separate rows of slots 7, the slots in one row alternating with those in the adjoining row. The under side of each grate has the webs 8 beneath the slot extended downwardly and provided with transverse openings in which are journaled the shafts 9 and 10, both of which being provided with transverse openings 11 to receive the auxiliary concaved teeth 12. At each end of these shafts there are secured suitable levers 13 and 14 which have pivotally connected to their ends the internally threaded nuts 15 engaged by the worm screws 16, whose operating shafts 17 extend to the outside of the machine and are provided with cranks 18 by which they may be rotated in either direction. Longitudinal webs 19 extend across the grate sections 6 and form abutments for the teeth 12 when the rear edge of the forward abutments are inclined, as shown at 20, so as to provide a rest and limiting stop for the rear teeth 12. The concave teeth and auxiliary concave may be mounted in the ordinary machine and either one or the other of the shafts 9 and 10, or both of them, may be operated so as to throw the teeth thereof out of operative position without stopping the machine. Two rows of auxiliary teeth are all that are needed for different grains.

Having thus described the invention, what I claim as new is:—

In a concave, an auxiliary concave section having transverse bars with inclined faces, rods journaled immediataely below and in line with said inclined faces, said rods carrying teeth, means for swinging said teeth up into bearing contact with the inclined faces, and for swinging said teeth below said bars.

In testimony whereof I affix my signature in presence of two witnesses.

PAUL W. LARSON.

Witnesses:
  FRED MIEHE,
  H. C. JOHNSON.

Copies of this patent may be obtained for five cents each, by addressing the "Commissioner of Patents, Washington, D. C."